Aug. 29, 1933.                J. W. TATTER                1,924,888
                       FLUID PRESSURE OPERATED DEVICE
                            Filed Dec. 28, 1929
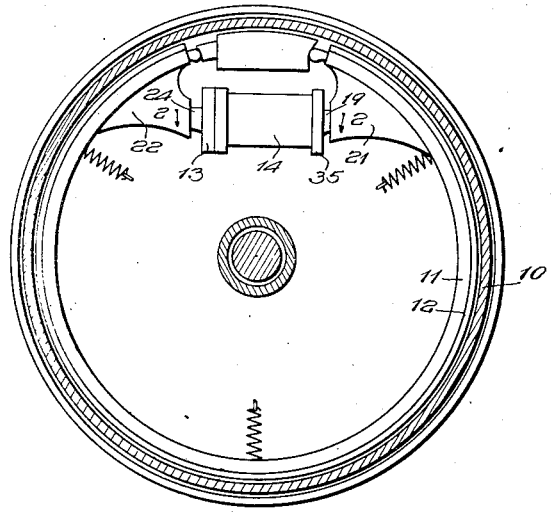
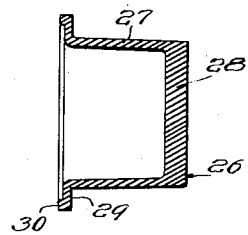
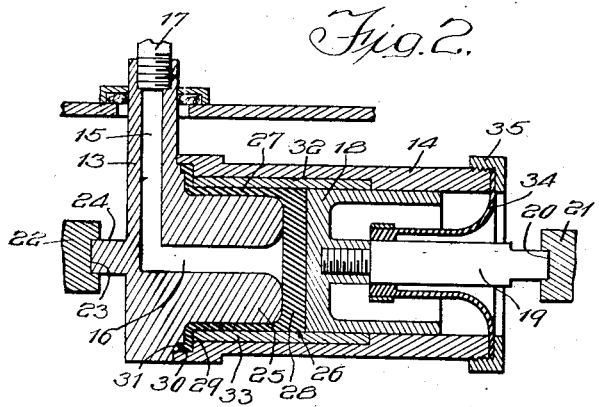
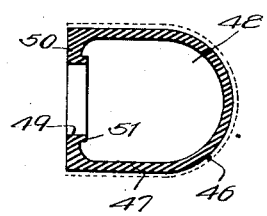
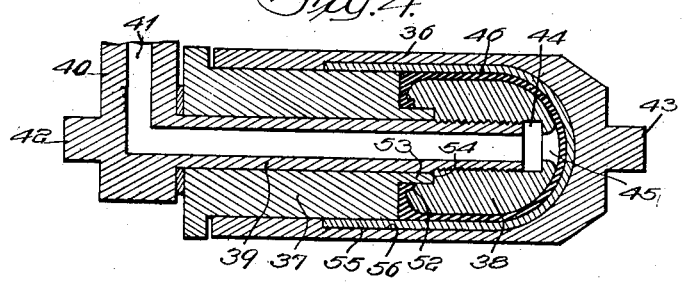
Witness:
William P. Kilroy
Inventor
John W. Tatter
By Hill & Hill
     Attys Patented Aug. 29, 1933

1,924,888

UNITED STATES PATENT OFFICE 1,924,888

FLUID PRESSURE OPERATED DEVICE

John W. Tatter, Chicago, Ill., assignor to Lewis Differential Company, Chicago, Ill., a corporation of Illinois Application December 28, 1929
Serial No. 417,115

4 Claims. (Cl. 60—54.6)

My invention relates to fluid pressure operated devices including packing means for preventing the leakage of fluid therefrom, and for maintaining such devices in operative condition.

The present application is a continuation, in part, of my copending application for improvements in Leak preventing devices, filed September 17, 1928—Serial No. 306,599.

The present invention is particularly adapted for use in hydraulic brake systems employed in motor vehicle construction, and a particular object of the present invention is to provide improved devices for preventing the escape of fluid from such systems, and insuring efficient operation of the braking devices.

Another object of the present invention is to provide devices of the kind described which will operate successfully over long periods of time and will not disintegrate or deteriorate when the mechanism in which they are embodied is subjected to much use.

A further object of the invention is to provide a device of the character described wherein fluid of a very high pressure may be employed for actuating the brake mechanism without in any way damaging the sealing or leak preventing means.

A further object of the invention is to provide means for facilitating the movement of relatively movable parts in a manner to insure efficient operation of the brake mechanism and for prolonging the life of the leak preventing means.

A still further object of the invention is to improve devices of the character disclosed in sundry details hereinafter described and particularly pointed out in the appended claims.

To this end, my invention consists in the novel construction, arrangement and combination of parts herein described and shown in the accompanying drawing which illustrates an embodiment of the present invention, and wherein Fig. 1 is a sectional elevation of a brake drum illustrating brake mechanism and a brake operating device embodying the present invention applied thereto;

Fig. 2 is an enlarged sectional view taken on the line 2—2 of Fig. 1;

Fig. 3 is a central longitudinal section taken through the sealing device shown in Fig. 2, and illustrating the normal form of the sealing device before it is positioned in the assembly of elements with which it is intended to cooperate;

Fig. 4 illustrates a modified form of the invention embodied in mechanism which may be used in the place of the mechanism illustrated in Figs. 1 and 2; and Fig. 5 is a central longitudinal section through the sealing device shown in Fig. 4 illustrating its normal form before being assembled with its cooperating elements as illustrated in Fig. 4.

Referring particularly to Figs. 1, 2 and 3 of the drawing, the present invention is shown embodied in a brake mechanism comprising a brake drum 10 adapted to be secured to a vehicle wheel (not shown), and a brake shoe or band 11 having brake lining 12 associated therewith and adapted to engage the drum 10 for applying a braking action to the vehicle wheel.

The brake mechanism shown in the present instance is of the hydraulic or fluid operated internal expanding type, and for expanding the band 11 and lining 12 into engagement with the drum 10, a coupling or connecting member 13 and cylinder 14 are interposed between the ends of the brake band, the cylinder 14 being rigidly connected to the member 13. The connecting member 13 is provided with a port 15 and a transversely disposed port or passage 16 communicating therewith, the port 15 being adapted to communicate with a pipe or conduit 17 by which fluid under pressure may be conducted from a suitable source of fluid pressure supply (not shown) to the cylinder 14 for actuating the brake mechanism.

Slidably journalled in the cylinder 14 is a piston 18 to which a rod 19 is rigidly secured, the outer end of the rod being adapted to engage a groove or recess 20 formed in a bracket member 21 rigidly secured to one end of the brake band 11. Secured to the other end of the brake band 11 is a bracket member 22 provided with a groove or recess 23 which is engaged by a lug 24 preferably formed integral with the connecting member 13.

Interposed between the piston 18 and a substantially cylindrical lug or boss 25 formed integral with the connecting member 13 is a cup-shaped member 26 formed preferably of resilient material, such, for example, as rubber, or the like. The cup-shaped member 26 is preferably provided with a substantially cylindrical wall 27 of relatively thin material and integrally connected to an imperforate disc or bottom portion 28 against which fluid conducted through the ports 15 and 16 may be forced. It will be noted that the disc portion 28 is relatively thick as compared with the cylindrical wall 27 and that the cylindrical wall is provided with an integral laterally projecting annular flange 29 which, at its peripheral edge, is provided with an annular flange or rib 30, the rib 30 being arranged to engage an offset portion 31 formed on the connecting member 13. The annular flange 29 is clamped securely between the connecting member 13 and the cylinder 14, the flange 29 being compressed so that it forms a seal between the adjacent portions of the connecting member 13 and cylinder 14.

The wall 27, in the present structure, is normally tapered as shown in Fig. 3 in a manner to be expanded slightly when the cup-shaped member 26 is assembled with the boss 25 to position the wall 27 and outer edge of the disc portion 28 with respect to the cylinder, the construction of the cup-shaped member 26 being such that when it is forced upon the boss 25, the wall 27 and disc portion 28 are expanded laterally so that the diameter of the cup-shaped member 26 is substantially equal to the diameter of the chamber within the cylinder 14.

When fluid under sufficient pressure is introduced into the port 15 and the passage 16 formed in the boss 25, it displaces the disc portion 28 to the right (Fig. 2) and elongates the wall 27. This displacement of the disc portion 28 causes like displacement of the piston 18 and it, in turn, displaces the bracket member 21 to expand the brake band 11. The connecting member 13 is arranged between the ends of the brake band 11 and is relatively free to move toward the left (Fig. 2) so that when fluid under sufficient pressure is introduced to the portions 15 and 16, both ends of the brake band are displaced in directions away from each other. It will be noted that the cup-shaped member 26 effectively seals the discharge end of the port 16 so that fluid cannot escape or leak from the cylinder 14.

It will be noted also that when fluid pressure is admitted to the cylinder 14 through the ports 15 and 16, and the disc portion 28 is displaced in a manner to move the piston 18 relatively to the cylinder 14 and boss 25, a pressure will be exerted on the relatively thin side wall 27 of the cup-shaped member 26. This pressure, however, by reason of the arrangement shown and described, is resisted by the relatively thick and unyielding wall of the cylinder 14, thereby retaining the cylindrical shape and contour of the cup-shaped member 26 and providing a structure wherein a fluid under very high pressure may be employed for operating the device, without in any way causing a rupture or otherwise damaging the yieldable and resilient relatively thin side wall of the cup-shaped member 26.

The frictional contact exerted between the wall 27 of the cup-shaped member 26 and the inner face of the cylinder 14 due to the fluid pressure within the cup-shaped member may be overcome to a considerable degree in the following manner:

The inner or attached end of the cylinder 14 is counter bored as indicated at 32, the counter bore extending a substantial distance beyond the normal position of the disc portion 28 toward the opposite end of the cylinder, and positioned within the counter bore is an anti-friction sleeve 33 surrounding the outer surface of the cup-shaped member 26 and a portion of the piston 18. The sleeve 33 is formed of suitable anti-friction material, such for example, as graphite, mica or soap-stone, or a composition of these or similar materials, and provides a surface for resisting the pressure within the cup-shaped member 26 and facilitates the longitudinal expansion of the cup-shaped member as the wall 27 thereof is elongated and the disc portion 28 is moved outwardly by pressure within the cup-shaped member to expand the brake band 11 and lining 12 into engagement with the brake drum 10.

It will be observed from the foregoing description that the present invention provides a device capable of employing pressures of a very high degree, thereby assuring maximum efficiency in the operation of the braking devices and, at the same time, providing for free movement of the cup-shaped member within its container, and contributing materially to the efficient operation of the device.

To prevent dust, dirt, or the like, from entering the cylinder 14 through the outer or right hand end thereof (Fig. 2), I preferably provide a flexible sleeve or cover 34 of rubber or other suitable material which has one of its ends or edge portions clamped to the rod 19, and has the other of its ends or edge portions clamped between one end of the cylinder 14 and a collar 35 screw-threaded thereon, thereby preventing foreign matter from entering the end of the cylinder 14, and insuring efficient free operation of the piston 18 within the cylinder.

In Figs. 4 and 5, I have shown a modified form of the invention wherein I provide a cylinder 36 in which a piston 37 is slidably journaled, the piston being of substantially cylindrical form and rigidly secured to a member 38 by means comprising a rigid tube 39 preferably formed integral with a connecting member 40. A port 41 formed in the connecting member 40, and the tube 39 provide means whereby fluid may be forced into the cylinder 36 from a pipe or conduit such as indicated at 17 in Fig. 2, it being understood that the mechanism shown in Figs. 4 and 5 can be used in place of the mechanism illustrated in Figs. 1 and 2. Formed on the connecting member 40 and on one end of the cylinder 36, respectively, are ribs or lugs 42 and 43 adapted to cooperate with bracket members formed on the ends of a brake band, and similar to the bracket members 21 and 22 shown in Fig. 2.

The member 38 is screw-threaded upon the tube 39, and is provided with a chamber 44 into which fluid may be introduced by way of the port 41, and it will be noted that the chamber 44 communicates with the exterior surface of the member 38 through a port 45 so that fluid introduced into the chamber 44 by way of the port 41 will exert pressure against a cup-shaped member 46 carried preferably by the member 38, and which is formed preferably from rubber or other suitable resilient material.

In this form of the invention shown in Figs. 4 and 5, the member 46 comprises a relatively thin wall 47 (Fig. 5) enclosing a chamber 48 into which the member 38 may be forced through an aperture 49 formed in a flange portion 50, the portion 50 being preferably formed integral with the thin wall 47. The flange portion 50 is preferably provided with an inwardly extending annular rim 51 adapted to engage a recess or counter bore 52 formed in the member 38. The flange portion 50 is relatively thick and when the member 46 is assembled with the piston 37 and member 38, it is compressed so that it forms a seal between these members. The amount that the flange portion 50 may be compressed is limited by a boss 53 which is formed upon the piston 37 and projects into a recess or counter bore 54 formed in the member 38. The internal diameter of the member 46 is normally less than the external diameter of the member 38 so that it is expanded when the member 38 is forced into it to suitably position the member 46 with respect to the cylinder 36. This is shown by dotted lines in Fig. 5.

When the apparatus shown in Figs. 4 and 5 is operated, fluid is forced into the chamber 44 by way of the port 41 and it passes through the port 45 to displace the cylinder 36 to the right (Fig. 4) and to displace the piston 37 to the left (Fig. 4) thereby elongating the cup-shaped member 46. As the flange portion 50 seals the joint between the piston 37 and member 38, fluid urged through the port 45 will be retained within the member 46 and will not escape or leak from the cylinder 36.

In the modified structure shown in Figs. 4 and 5, as in the structure illustrated in Figs. 1 and 2, the pressure admitted through the port 41 will be exerted against the relatively thin walls 47 of the cup-shaped member 46, but it will be noted that such pressure is resisted by the relatively thick unyielding walls and end portion of the cylinder 36, thereby retaining the shape and contour of the cup-shaped member 46 and providing a structure wherein relatively high pressure may be employed for expanding the brake band into effective engagement with the brake drum.

For overcoming the frictional contact between the outer surface of the cup-shaped member 46 and the inner surface of the cylinder 36 due to the pressure within the member 46, the closed end of the cylinder 36 is provided with a cup-shaped lining 55 of anti-friction material positioned in a depression 56 formed in the inner surface of the cylinder 36, and adapted to completely surround the resilient member 46 and cover one end thereof, the lining 55 being adapted to extend along the straight portion of the side wall 47 of the member 46 and a substantial distance beyond the end thereof.

The lining 55, as in the structure shown in Figs. 1 and 2, may be formed of suitable anti-friction material, as for example, graphite, mica or soapstone, or a composition of such materials, and may be provided with a suitable binder to permit of molding the material into the depression 56. The inner surface of the lining 55 serves to resist the pressure within the cup-shaped member 46 and facilitate the relative movement between the member 46 and the cylinder 36 as the latter is moved outwardly and the body portion and side wall 47 of the resilient member 46 are stretched and elongated due to the pressure exerted from within the cup-shaped member.

It will be observed from the foregoing description that the present invention provides a device wherein fluid under a very high degree of pressure may be employed for actuating brake mechanism without in any way damaging the sealing or leak preventing means, and also provides means for facilitating the movement of the leak preventing means in a manner to prolong the life of such means and insure efficient operation of the brake mechanism.

Obviously, the present invention is not limited to the precise construction and arrangement shown and described, as the same may be variously modified. Moreover, all the features of the invention need not be used conjointly as the same may be used to advantage in variously different combinations and sub-combinations.

Having thus described the invention, what I claim is:

1. In a device of the class described, the combination of a pair of relatively movable members, a cup-shaped resilient packing element rigidly secured to one of said members, the other of said members having a recess formed in its inner surface, and an anti-friction lining positioned in said recess and rigidly associated with said other of said members in a manner to surround said packing element.

2. In a device of the class described, the combination of a pair of relatively movable members, a cup-shaped resilient packing element rigidly secured adjacent its edge portion to one of said members, the other of said members having a recess formed therein adjacent said packing element, and an anti-friction lining positioned in said recess between said other member and packing element and rigidly associated with said other of said members.

3. In a device of the class described, the combination of a pair of relatively movable members, a cup-shaped resilient packing element rigidly secured adjacent its edge portion to one of said members, the other member having a recess formed therein, and a non-metallic anti-friction lining rigidly secured in said recess and associated with the other of said members in a manner to engage the side wall and bottom portion of said packing element.

4. In a device of the class described, the combination of a pair of relatively movable members, a cup-shaped resilient packing element rigidly secured adjacent its edge portion to one of said members, the other of said members having a recess formed therein adjacent said packing element and normally extending beyond the edge portion thereof, and a cup-shaped anti-friction lining positioned in said recess between said other member and packing element in a manner to surround the side wall and bottom portion of the packing element and to extend beyond the edge portion thereof.

JOHN W. TATTER.